United States Patent [19]

Bergey, Jr. et al.

[11] 4,291,235
[45] Sep. 22, 1981

[54] WINDMILL

[76] Inventors: Karl H. Bergey, Jr.; Michael L. S. Bergey, both of Rte. 1, Box 151-B, Norman, Okla. 73069

[21] Appl. No.: 15,290

[22] Filed: Feb. 26, 1979

[51] Int. Cl.³ .............. F03D 9/00; H02P 9/04; H02K 7/00; B63H 1/26
[52] U.S. Cl. .................. 290/55; 290/44; 310/67 R; 310/156; 416/240
[58] Field of Search .............. 290/44, 43, 54, 55, 290/52, 5; 310/49 R, 156 R, 67 R, 112; 416/240, 132

[56] References Cited

U.S. PATENT DOCUMENTS

| | | |
|---|---|---|
| 2,248,218 | 7/1941 | Daniels .............. 290/55 |
| 3,275,082 | 9/1966 | Stark .............. 416/240 |
| 3,860,843 | 1/1975 | Kawasaki et al. .............. 310/67 |

OTHER PUBLICATIONS

Wind Power Digest, Spring 1978, pp. 6–9.

*Primary Examiner*—J. V. Truhe
*Assistant Examiner*—John B. Conklin
*Attorney, Agent, or Firm*—Laney, Dougherty, Hessin & Beavers

[57] ABSTRACT

This invention relates generally to an improved windmill design that combines the blade and rotor support system with the electrical generating system in such a way as to simplify the windmill construction. Specifically, it eliminates the need for shafts, gears, and other coupling devices between the turbine blade system and the electrical generating system. In addition, the windmill design also includes a means for varying the pitch of the turbine blades automatically so as to provide near-optimum blade angles under varying wind conditions, and a tendency toward self-governing at high wind speeds. Furthermore, the blades are attached rigidly to the hub without the need for bearings or other mechanical couplings. Blade pitch changes are produced by twisting the blades elastically by forces produced by fixed weights. The effect of these features individually and in combination is to reduce the complexity of the wind turbine, the generating system, and their associated parts.

31 Claims, 12 Drawing Figures

WINDMILL

BACKGROUND OF THE INVENTION

1. Field of the Invention

The present invention relates to a device with electrical, mechanical and aerodynamic features that enable it to convert the energy in the wind to usable electrical power.

2. Description of the Prior Art

As the supply of conventional fossil fuels decreases and their costs increase, modern industrial society will turn increasingly to alternate sources of energy. Of these, windpower is one of the most promising since it is abundant, widely distributed and environmentally benign. It has also established its ability to meet the needs of society through usage over many hundreds of years and in many parts of the world. In today's industrial society, however, windpower will be accepted as a satisfactory replacement for conventional fuels only if it is convenient to use and low in cost. Both of these conditions are satisfied if the wind machine is simple in construction, aerodynamically efficient and capable of unattended operation.

Since the desired blade angle or pitch of horizontal axis wind turbines varies with wind speed and rotational speed, it has been common practice to support the turbine blades in bearings that allow the blades to rotate about their longitudinal axis. In this way, the blade angles may be changed through suitable mechanical linkages and control systems that sense the need for a change in blade angle and provide the necessary input signals. Thus, in the past, windmills for electrical generation have gained efficiency at the cost of aerodynamic, mechanical and control system complexity.

Conversely, simple windpower machines with rigid fixed-pitch blades operate at their highest efficiency only at a single combination of wind speed and rotational speed. At all other combinations, the blade angle is either too high or too low. As a result, fixed-pitch turbines operate at relatively low efficiency, require high start-up windspeeds, and have little inherent tendency toward self-governing at high wind speeds.

Thus, the alternatives have been, on the one hand, relatively efficient machines that are complex, expensive, and difficult to maintain, and, on the other hand, relatively inefficient machines that are simple, inexpensive and difficult to control at high wind speeds.

Furthermore, the disparity between the relatively slow rotational speed for wind turbines and the high rotational speed for most electrical generators has led to the use of gears, belts or other speed-increasing devices between the turbine and the generator. The resulting complexity has tended to increase the initial costs and the maintenance requirements for windpower generators of this type.

The present invention overcomes these problems to a large extent by providing a variable pitch turbine blade assembly having no moving parts, and by eliminating all gearing between the turbine blade assembly and the electrical generating system.

The turbine blade assembly will start-up at low wind speeds, and is self-governing at high wind speeds. This is accomplished by the use of a plurality of torsionally flexible cambered sheet airfoil blades rigidly mounted at their radially inner ends to a central hub. These blades have an out-of-plane balance weight attached near the radially outer end of their leading edge. A component of the centrifugal force acting on this out-of-plane balance weight acts to twist the blades about their respective radial axes so as to decrease the pitch of the blades with increasing rotational speeds. The system is constructed so that a radially outer portion of the blades will stall at a predetermined rotational velocity thereby causing the system to be self-governing at that velocity.

Out-of-plane balance weights have previously been used with torsionally non-flexible blades having a short torsionally flexible connecting means located between a radially inner end of the blade and the hub. In those apparatus the out-of-plane weight has typically been connected adjacent the connection of the radially inner end of the blade and the torsionally flexible connecting means. In such apparatus, the change in blade pitch which occurs with varying rotational speed is a uniform change along the entire radial length of the blade, as opposed to the continuously varying change in blade pitch which occurs with the present invention. An example of such a prior art device is disclosed in Cheney and Spierings, "Self-regulating Composite Bearingless Wind Turbine", report No. C00/2614-7612 (September 1976) prepared for the United States Energy Research and Development Administration under Contract No. E(11-1)-2614. Another apparatus similar to that of Cheney and Spierings is disclosed in *Wind Power Digest*, No. 12, pp. 7–9 (Spring/Summer 1978), although sufficient facts are not presently known to us to determine whether this latter disclosure, or the apparatus referred to therein, constitutes prior art with respect to our invention.

The elimination of gearing between the turbine blade assembly and the electrical generating system is achieved in the windmill of the present invention by the use of an alternator comprising a stationary multiple pole wound stator, and a multiple permanent magnet structure rotatably mounted coaxial with the stator. The permanent magnet structure is rigidly attached to the rotating turbine blade system so as to rotate therewith, thereby eliminating the need for drive gears or the like between the turbine blade system and the electrical generating system. Similar alternators, used singly, that is without coaxially stacking a plurality of alternators, are known to the art as described in T. Carmichael, "Ignition and Battery Charging with Permanent Magnet Alternators", SAE paper no. 670046 presented at Automotive Engineering Congress, Jan. 9–13, 1967, in Detroit, Mich.

SUMMARY OF THE PRESENT INVENTION

It is the object of the present invention to provide a means by which wind energy may be converted to electrical power at minimum cost through a combination of simplified mechanical and aerodynamic features of the complete wind turbine generating system.

The improved windmill construction eliminates all gearing between the turbine blade assembly and the electrical generating system. This simplification is accomplished by incorporating the electrical generation system into the rotor support system and by using permanent magnet alternator components that are compatible with this type of construction. Specifically, the electrical generating system consists of a number of concentrically stacked (modular) stationary multiple-pole wound stators fixed to a non-rotating shaft mounted with its axis paralled to the wind flow. An equal number of complementary stacked multiple permanent-magnet field elements are rotatably mounted co-axially with the stators. Poles of adjacent stators are staggered so as to minimize the cogging effect present in alternators with permanent magnet field elements.

The turbine blade system comprises a plurality of torsionally flexible cambered sheet airfoil blades rigidly mounted to the same rotatable structure that supports and contains the permanent-magnet field elements. Although rigidly mounted at their inboard attachment to the hub structure, the blades may be twisted due to their torsional flexibility so as to provide a variable pitch system. The initial high pitch is set so as to provide a favorable rotational force at low wind speeds to overcome the residual magnetic cogging effect. As the rotational speed of the turbine increases, the pitch of the blades is automatically and continuously decreased so as to improve the aerodynamic efficiency at high tip speed ratios. This pitch change with increasing rotational speed is obtained through the use of an out-of-plane balance weight attached to the leading edge of the outer portion of each blade. As the rotational speed of the turbine increases, a component of the centrifugal force acting on the out-of-plane balance weight applies a torsional force to the outer portion of the torsionally flexible turbine blades, thereby twisting the blades about their radial axes in such a way as to decrease the pitch. Thus, the blades are automatically adjusted to operate at, or close to, their most efficient angles of attack throughout the operating speed range of the turbine.

It is also desirable to limit the rotational speed of the turbine when the wind is blowing at speeds greater than the design speed of the turbine. The out-of-plane balance weights serve this function by causing the blades to continue twisting as the rotational speed increases above the design value. This action further increases the angle of attack of the blades. At very high rotational speeds, the airfoil section of the blades reaches its stalling angle of attack, thereby reducing the blade lift forces. Thus the turbine blade system tends to be self-governing at wind speeds and rotational velocities above the design values.

The out-of-plane balance weights serve an additional function. Since the elastic axis of the thin sheet airfoils is behind the aerodynamic center of the airfoil and at or behind the center-of-gravity of the airfoil, there is a tendency for the blades to flutter as the rotational speed increases. Flutter in this case is a self-sustaining torsional vibration of the blades in which the angle-of-attack varies above and below the nominal value at relatively high frequency and in such a way as to decrease the aerodynamic performance of the turbine blade system and cause high structural loads. The forward location of the out-of-plane balance weights serves to move the center of gravity well ahead of the elastic center of the blades, thereby raising the flutter speed above the operating range of the windmill system.

The design of the turbine blade and generator systems is such that the major bearing on which the turbine blade system rotates is in the plane of the blades, thereby applying the in-plane forces and out-of-plane moments more directly to the bearing and avoiding the development of cyclic bending loads in an overhung shaft as is typical of many wind generator designs.

A further advantage of the subject turbine/generator configuration is that the multiple-pole wound stators are fixed to the structure of the machine. Thus, the generated electric current can be transferred directly from the generator without the need for slip-rings or other devices for transferring current through rotating mechanical components.

It is therefore an object of the present invention to provide an improved windmill design which eliminates the need for any mechanical coupling, by gears or the like, between the turbine blade system and the electrical generating system.

Another object of the present invention is the provision of an improved electrical generating system for a windmill, comprised of a plurality of concentrically stacked, radially staggered, stationary multiple pole stator type alternators.

And another object of the present invention is the provision of a self-governing turbine blade system.

Yet another object of the present invention is the provision of a self-governing turbine blade system comprising continuously torsionally flexible cambered sheet airfoils rigidly attached to a central hub, with an out-of-plane weight attached to a radially outer portion of the leading edge of the blades.

Other and further objects and advantages will be apparent to those skilled in the art upon a reading of the detailed description in conjunction with the accompanying drawings.

BRIEF DESCRIPTION OF THE DRAWINGS

FIGS. 3a and 3b are front elevation views of an end portion of one of the blades 20, illustrating first and second alternative embodiments 58a and 58b, respectively, of the out-of-plane weight assembly.

DETAILED DESCRIPTION OF THE PREFERRED EMBODIMENTS

Figure 1:
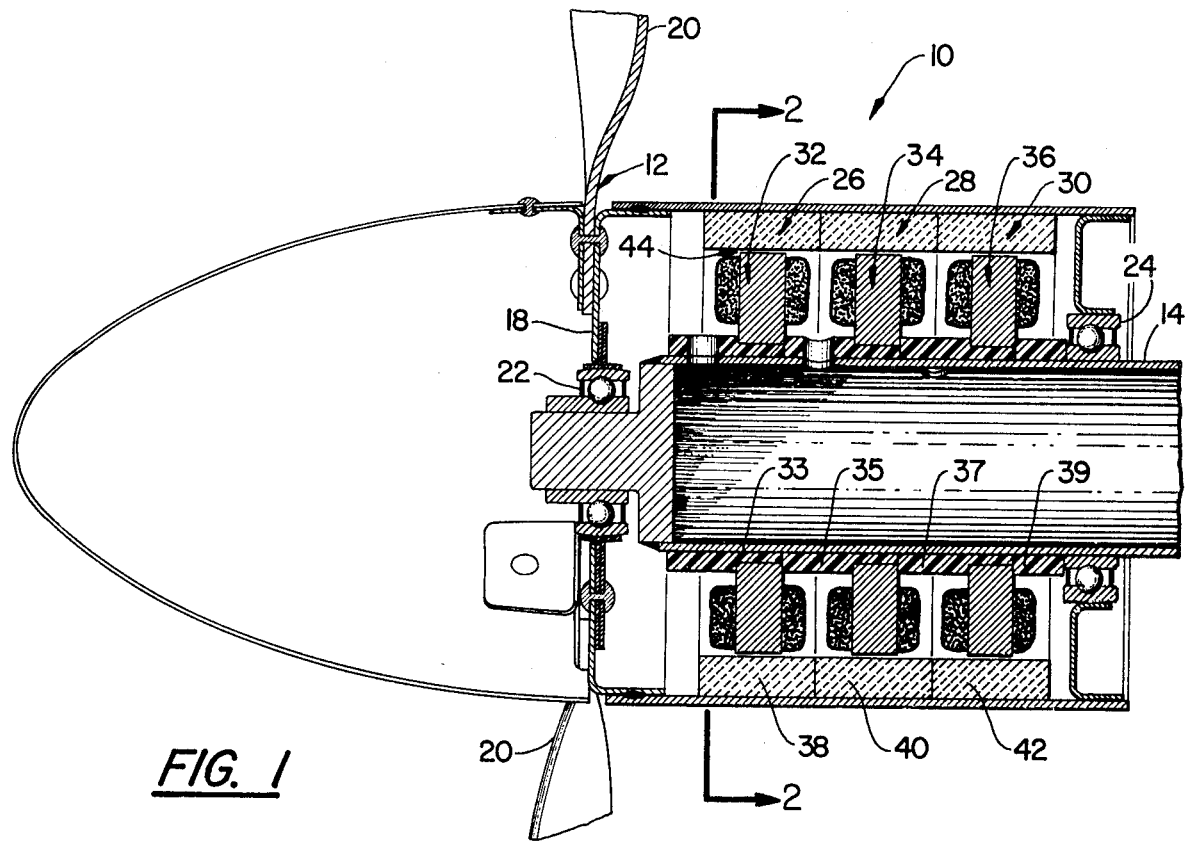
FIG. 1 is a sectional side elevation view of the windmill of the present invention.

Referring now to the drawings, and particularly to FIG. 1, the windmill of the present invention is shown and generally designated by the numeral 10. The yaw bearing and tail assembly are not shown since they do not constitute unique aspects of the present invention.

Windmill 10 includes a turbine blade system 12 which is rotatingly mounted upon a fixed shaft 14 which is fixedly attached to a windmill housing (not shown).

Turbine blade system 12 includes a central hub 18 to which is rigidly attached a plurality of cambered sheet turbine blades 20. The individual blades 20 are constructed out of thin aluminum sheets to which radial curvature and chordwise twist are added. The blades 20 may also be constructed of fiber-reinforced plastic or other suitable structural materials. The resulting blade cross section, illustrated in FIG. 3c, is that of a single surface or cambered sheet airfoil. The term "cambered" refers to the fact that the blade camber line 21 is not coincident with the blade chord line 23.

Figure 3:
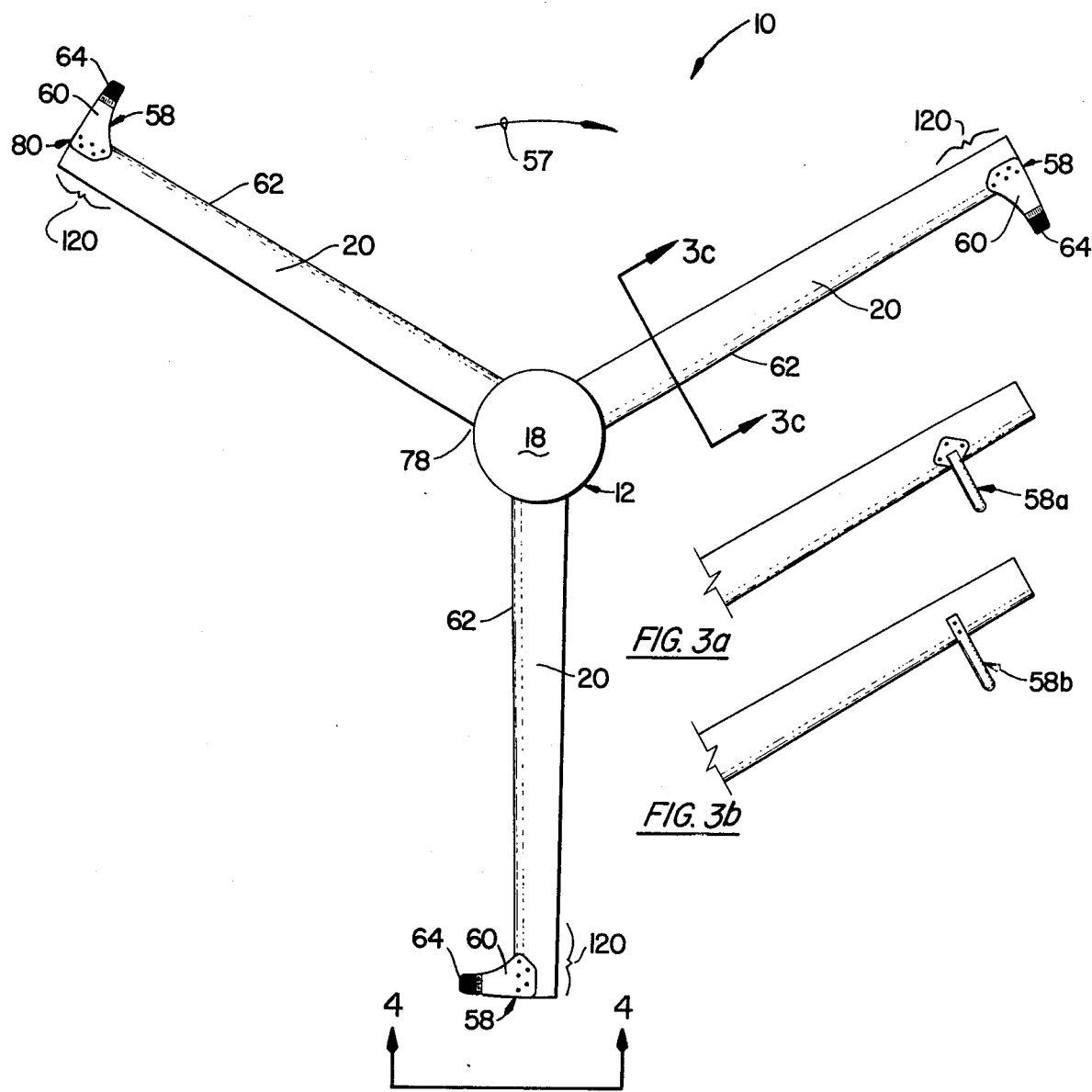
FIG. 3 is a front elevation view of the windmill of FIG. 1.
Figure 3C:
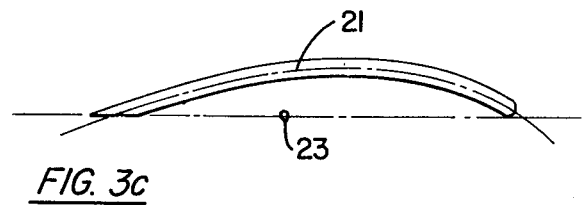
FIG. 3c is a section view taken along line 3c—3c of FIG. 3, illustrating the cross-section of a cambered sheet airfoil.

The three blade arrangement shown in FIG. 3 is somewhat more desirable than a two blade arrangement because at all points through a revolution the rotor maintains a constant moment of inertia relative to the yaw axis. This attenuates the vibrations induced into the system as the rotor yaws to accommodate a shifting wind direction.

The hub 18 is rotatingly connected to shaft 14 by front and rear bearings 22 and 24, respectively.

Connected between hub 18 and shaft 14 are first, second and third alternator units 26, 28 and 30, respectively. The alternator units 26, 28 and 30 comprise stationary multiple pole wound stators 32, 34 and 36, respectively, and multiple permanent magnet field structures 38, 40 and 42, respectively, rotatably mounted coaxial with the stators 32, 34 and 36, respectively.

Stators 32, 34 and 36 are mounted upon stator spacers 33, 35 and 37, respectively. Stator 36 is separated from bearing 24 by spacer ring 39.

Each of the stator spacers is slidingly received on shaft 14 and then fixed in place with a set screw or other retaining means (not shown). Stator spacers 33, 35 and 37 serve to properly space stators 32, 34 and 36 from each other along the length of shaft 14.

This construction permits one or more additional alternators to be easily added to the windmill 10. For example, the hub 18 and shaft 14 could be dimensioned to provide room for six or more alternator units. Then the windmill 10 could be assembled with anywhere from one to six or more alternators, depending on the generating capacity which is required. If less than six alternators were initially installed, additional ones could easily be added at a later time. The addition of additional alternators serves to increase the electrical power generating capacity of the windmill 10.

Front and rear bearings 22 and 24 are located on shaft 14 at opposite ends of the alternator units 26, 28 and 30. Such an arrangement is highly preferable to the more conventional arrangement which would have all bearings located to the rear of any generating device. It is important, when using alternators of the type just described, that the clearance 44 between stators 32, 34 and 36 and magnet structures 38, 40 and 42 be maintained. The placement of bearings 22 and 24 at opposite ends of the alternators maintains this clearance much more precisely than could be accomplished with similarly sized components arranged so that hub 18 was cantilevered over the stators 32, 34 and 36. More particularly, front bearing 22 is located in the plane of rotation of blades 20, so that the radial forces generated by the rotating blades are transmitted directly to shaft 14 through front bearings 22.

Figure 2:
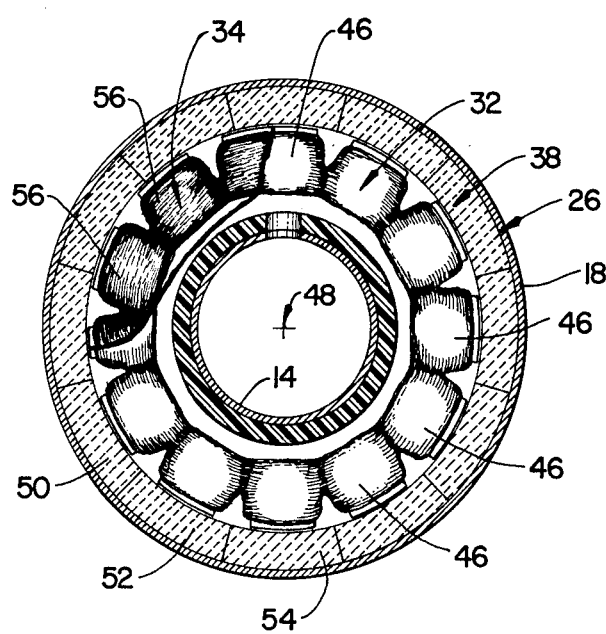
FIG. 2 is a sectional view of the windmill of FIG. 1, taken along lines 2—2.

Referring now to FIG. 2, a sectional view taken along lines 2—2 of FIG. 1 is shown with part of first stator 32 cut away so that a portion of second stator 34 is visible.

First stator 32 includes twelve stationary poles 46, equally angularly spaced at angles of 30° about the central axis 48 of shaft 14. First magnet structure 38 includes twelve magnets, such as those designated 50, 52 and 54, which are similarly spaced 30° apart. Adjacent magnets of the first magnet structure 38 are of opposite signs, i.e. one has its north pole facing the stator 32 and the other has its south pole facing the stator 32. For example, magnet 50 has a south pole facing the stator 32, magnet 52 has a north pole facing stator 32, and magnet 54 has a south pole facing stator 32. It is of course possible to construct such an alternator unit with a lesser or greater number of equally spaced stationary poles 46.

As is revealed by the cut away portion of first stator 32, the second stator 34 is angularly offset from the first stator 32 by an angle of 10°. That is, the poles 56 of second stator 34 are not axially aligned with poles 46 of first stator 32, but rather they are rotationally displaced 10° in a counterclockwise direction, as viewed in FIG. 2, from a position of axial alignment with poles 46 of first stator 32. The poles of third stator 36 are similarly offset 10° counterclockwise from the poles of second stator 34.

This staggering of the stator poles is very important to reduce the initial torque required to initiate rotation of the stacked alternator units 26, 28 and 30. This is because of the cogging effect present in this type of alternator. This cogging effect can best be understood by viewing FIG. 2. As thereshown, the magnets, e.g. 50, 52, 54, of first magnet structure 38 are oriented opposite the stationary poles 46 of first stator 32. If the first alternator 26 were being used alone it would always come to rest in that orientation. The magnets act to draw the poles 46 as closely as possible. This effect must be overcome to initiate rotation of the magnet structure 38. The magnet structure 38 tends to move in angular steps of 30°, that is its "cogs", at very low speeds. This problem is overcome to a large degree by staggering adjacent alternator units so that it is only possible for one stator to have its poles aligned with the magnets of its rotating magnet structure at any given time. For other than three alternator units, or for units having other than twelve poles, the appropriate angular offset between alternator units is determined in a manner similar to that illustrated above.

Additionally, the magnets of the rotating magnet structures 38, 40 and 42 are axially aligned in twelve axial rows so that the magnets in each row have their magnetic poles or ends oriented in the same direction. For example, there are two magnets aligned directly behind magnet 50 as viewed in FIG. 2, forming an axial row of magnets. All of the magnets in that row have their south ends facing their respective stator 32, 34 or 36. That is, the ends facing the stators all have the same magnetic sign. This increases the strength of the magnetic field created by the magnet structures 38, 40 and 42 because the fields of the axially aligned magnets reinforce one another.

Referring now to FIG. 3, a front elevation view of windmill 10 is shown. Turbine blade system 12 rotates in the direction indicated by arrow 57. On the radially outer end of each blade 20 is an out-of-plane weight assembly 58. Assembly 58 includes a bracket 60 extending forward from a leading edge 62 of each blade 20.

Attached to the forward end of each bracket 60 is a weight or mass 64.

The blades 20 are torsionally flexible cambered sheet airfoils. The out-of-plane weight assemblies 58 are constructed so as to rotate the blades 20 about their torsional axes, so that the pitch of the blades 20 is varied as the rotational speed of the blades varies. This is best understood by viewing FIGS. 4 and 5.

Before explaining the theory and manner of operation of the self-governing feature of turbine blade system 12, certain terms need to be defined to describe the orientation of an airfoil relative to the structure upon which it is mounted, and relative to the direction of the resultant wind vector impinging on the airfoil.

Figure 4:
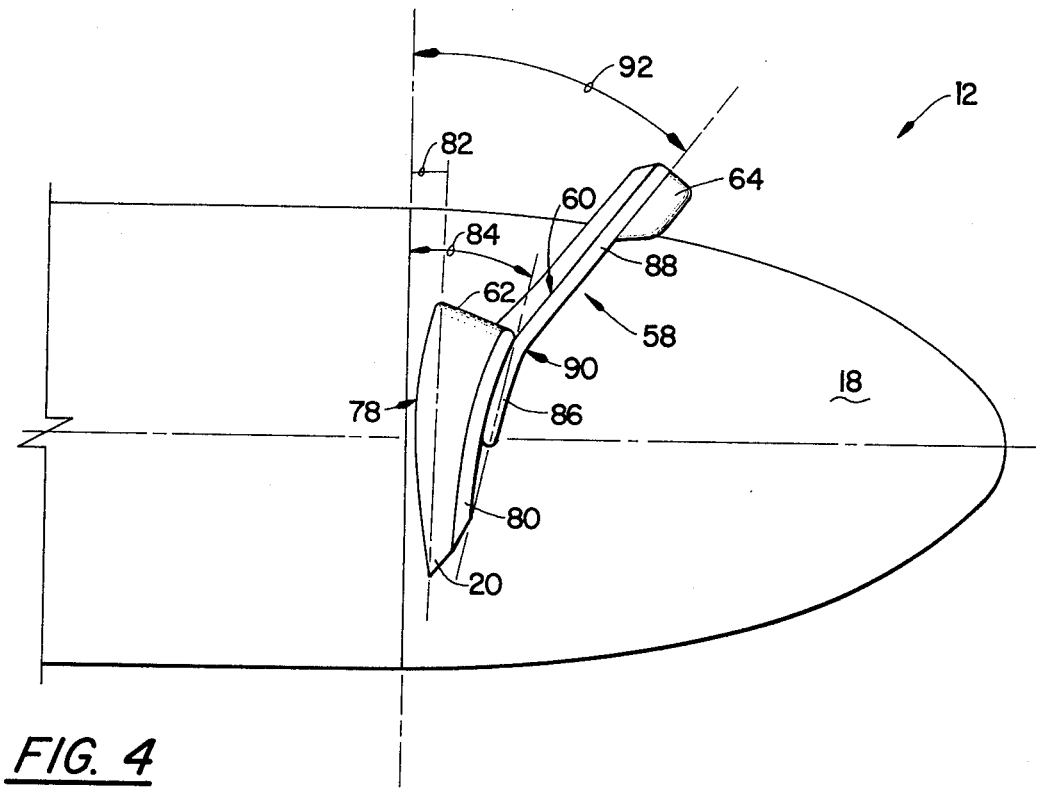
FIG. 4 is an end view of one of the blades of the windmill of FIG. 3, taken along lines 4—4, and showing the orientation of the blade when the blades are not rotating.
Figure 5:
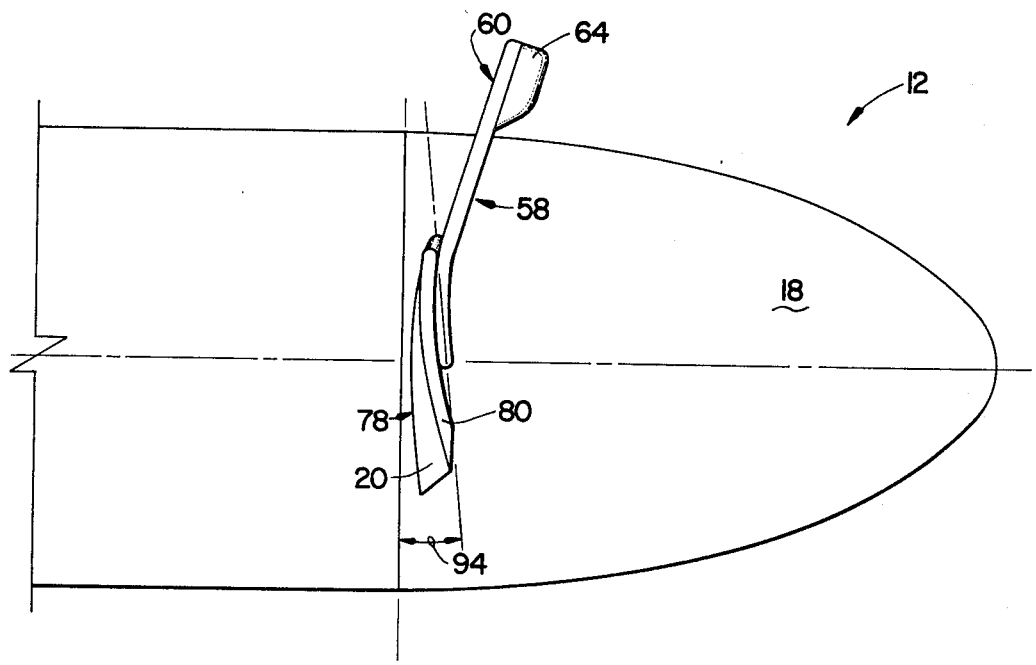
FIG. 5 is a view similar to FIG. 4, showing the orientation of the blade when the blades are rotating at high rotational velocity.
Figure 6:
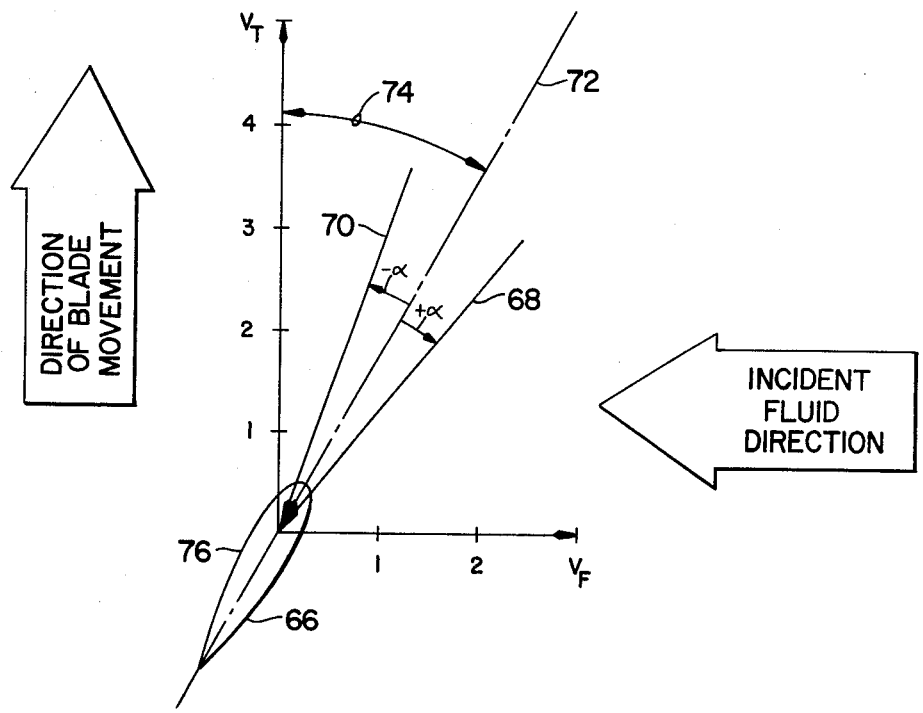
FIG. 6 is a schematic representation of a typical airfoil showing the various vectors used to describe the orientation of the airfoil relative to the incident fluid.

Referring to FIG. 6, a cross-section view of an airfoil 66, oriented similar to the blade 20 of FIG. 4 is shown. The actual cross-sectional shape of the airfoil 66 is not important at this point, and as is seen in FIGS. 4 and 5, the preferred airfoil shape for blade 20 is a cambered sheet rather than the symmetrical shape airfoil 66 seen in FIG. 6. The concept being illustrated here, however, is more easily visualized with reference to a symmetrical airfoil shape as shown in FIG. 6. FIG. 6 shows the orientation of the airfoil 66 with respect to the resultant fluid velocity at different tip speed ratios, X. The tip speed ratio, X, is defined as the ratio of the velocity of the blade tip, $V_T$, to the velocity of the incident fluid, $V_F$. The blade tip velocity $V_T$ equals the product of the rotational velocity of the blade in radians per unit time multiplied by the radial length of the blade. Neglecting the load, the rotational velocity of the blade is of course dependent upon the velocity of the incident fluid and the efficiency of the blade, and for positive blade efficiencies, the rotational speed will increase as the fluid velocity increases. The resultant fluid velocity relative to the tip of the blade 20 is the vector sum of the fluid velocity, $V_F$, and the blade tip velocity, $V_T$. The direction of this resultant vector varies with the tip speed ratio X. Note that to determine the resultant fluid velocity vector at some point radially inward of the blade tip, the blade tip velocity must be replaced by the analogous tangential velocity of that point on the blade.

For example, a relatively low speed resultant fluid velocity vector 68 occurs for X=2.0. A relatively high speed resultant fluid velocity vector 70 occurs for X=6.0. Note that the slope of the resultant fluid velocity vectors is equal to the ratio of $V_T$ to $V_F$, i.e., it is equal to X. For a given resultant fluid velocity vector, the angle of attack, $\alpha$, is defined as the angle between an airfoil reference plane 72 of airfoil 66 and the resultant fluid velocity vector. Angles of attack measured clockwise, as seen in FIG. 6, from the airfoil reference plane 72 are referred to as positive, $+\alpha$, and those measured counterclockwise are referred to as negative, $-\alpha$. It is seen in FIG. 6 that, for the blade orientation shown, $\alpha$ is positive for X=2.0, and $\alpha$ is negative for X=6.0.

The direction of blade movement, represented by the upward vertical axis in FIG. 6 lies in the plane of rotation of blades 20. The angle between the plane of rotation of the blade and the airfoil reference plane, indicated as angle 74, is the pitch or blade angle of the airfoil, sometimes referred to as $\beta$. A $\beta$ measured clockwise from the direction of blade movement as viewed in FIG. 6, is a positive $\beta$. A $\beta$ measured counterclockwise from the direction of blade movement is a negative $\beta$.

Another concept which is necessary to an understanding of the following explanation is the stall angle of an airfoil. The stall angle is the value of $\alpha$ at which the air flowing past the airfoil 66 breaks away from an upper surface 76 of the airfoil. At the stall angle the lift provided by the airfoil begins to rapidly decrease and the drag on the airfoil rapidly increases due to increased turbulence.

In a turbine blade system, such as the windmill 10, when the blades 20 stall at a high rotational velocity, the turbine blade system 12 will not turn substantially faster, regardless of any increase in incident windspeed, and the turbine blade system is self-governing at approximately that particular rotational velocity.

Referring now to FIGS. 4 and 5, the construction of blades 20 and out-of-plane weight assemblies 58 will be further described, along with a description of their manner of operation.

FIG. 4 shows an end view of a blade 20 along lines 4—4 of FIG. 3. FIG. 4 shows the orientation of blade 20 and weight assembly 58 when the turbine blade system 12 is not rotating. FIG. 5 is a view similar to FIG. 4, but shows the orientation of blade 20 and assembly 58 when the turbine blade system 12 is rotating at high RPM.

Blade 20 has a root end or radially inner fixed portion, 78, and a tip end or radially outer free end, 80. Blade 20 is twisted along its radial length, so that in the at rest position of FIG. 4, the root end 78 has a pitch angle 82 and the tip end 80 has a pitch angle 84.

The weight bracket 60 includes a connecting portion 86 and an extending portion 88 connected at bend 90. The extending portion 88 has a pitch angle 92. Alternate configurations and locations of the weight assembly are illustrated in FIGS. 3a and 3b as weight assemblies 58a and 58b, respectively. Weight assemblies 58a and 58b each include a cylindrical mass extending forward of and leading the leading edge 62 of blade 20.

The relatively high initial pitch of the tip 80 and the bracket 60, illustrated in FIG. 4, allow the turbine blade system 12 to begin rotating at low incident wind speeds. The high pitch is necessary to extract sufficient force from the low speed winds to overcome the restraining effect due to magnetic cogging in the alternators, as previously described.

As the rotational velocity or RPM increases, a component of the centrifugal force acting on the out-of-plane balance weight 64 acts to twist the blade 20, counterclockwise toward the position illustrated in FIG. 5. In the position of FIG. 5, tip 80 has been moved to such a position that it now has a negative $\beta$ illustrated as angle 94.

When tip 80 reaches the position of FIG. 5, the value of $\alpha$ reaches the stall angle so that a portion of the outer end of each blade 20, designated as 120 on FIG. 3, stalls thereby preventing the rotational speed from further increasing, and causing turbine blade system 12 to be self-governing at that RPM.

The rotational speed at which blade 20 will be twisted an amount sufficient to cause it to stall depends primarily upon the mass of weight 64, the position of weight 64 relative to blade 20, and the torsional characteristics of blade 20.

Figure 7:
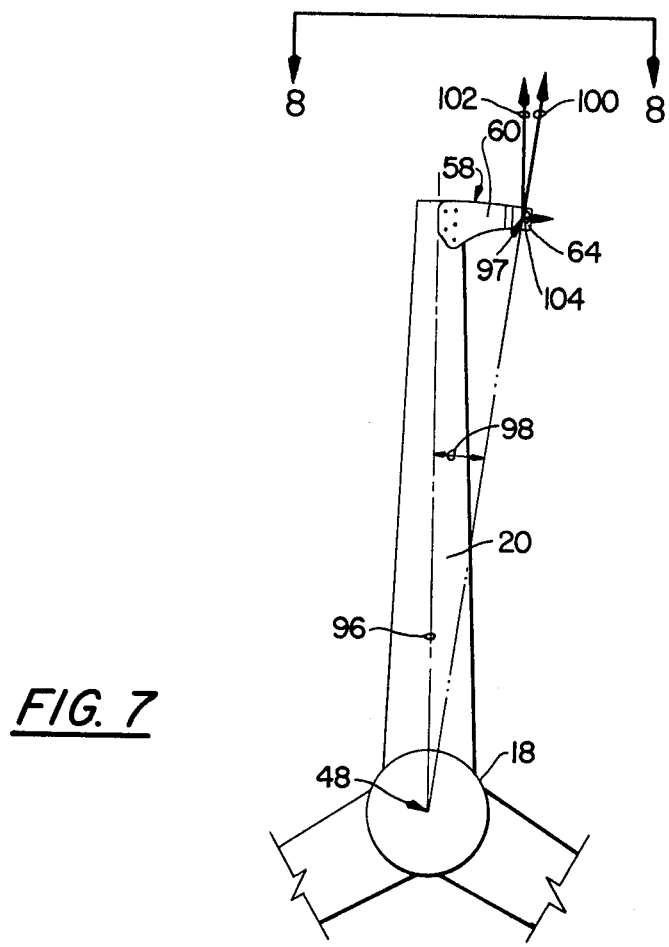
FIG. 7 is a partial front view, similar to FIG. 3, illustrating the various forces acting on the out-of-plane weight.

The manner of operation of out-of-plane weight assembly 58 can best be explained with reference to FIGS. 7 and 8. FIG. 7 is a view similar to FIG. 3, showing the details of only one of the blades 20. The elastic axis of blade 20 is indicated by reference numeral 96. The elastic axis 96 of blade 20 is the radial axis about which the blade will twist when a purely torsional force is applied to the blade. The center of mass 97 of weight 64 leads axis 96 and is offset by an angle 98 from elastic axis 96. The centrifugal force acting on weight 64 is represented by vector 100. Vector 100 can be resolved into two component vectors 102 and 104. Vector 102 acts parallel to axis 96 of blade 20 and is opposed by a corresponding tensile force in blade 20.

Figure 8:
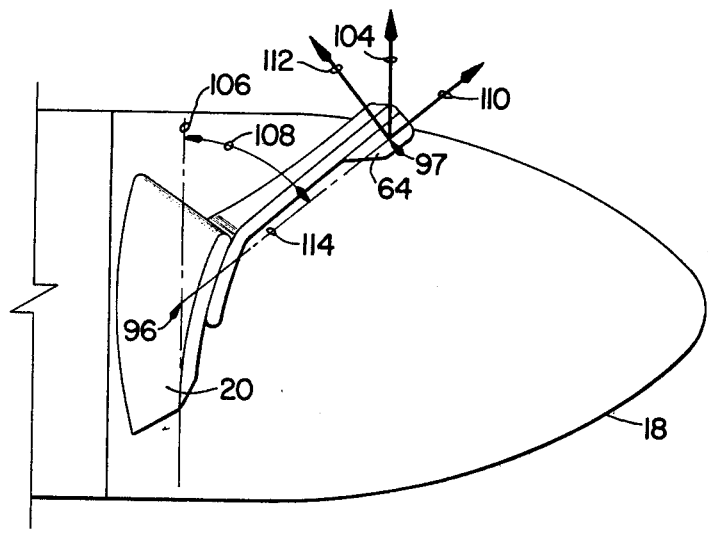
FIG. 8 is an end view, along lines 8—8, of the blade of FIG. 7.

Referring now to FIG. 8, the vector 104 is illustrated as it would appear when viewed along line 8—8 of FIG. 7. Vector 104 lies in a plane parallel to the plane of rotation 106 of the elastic axis 96 of blade 20. The center of mass 97 of weight 64 is forward of plane 106 and is offset an angle 108, about elastic axis 96, from plane 106. Vector 104 can itself be resolved into two component vectors 110 and 112. Vector component 110 intersects elastic axis 96. Vector component 112, however, acts perpendicular to imaginary line 114 between axis 96 and center of mass 97.

It is vector component 112 which acts to torsionally rotate blade 20 as the rotational velocity of the blade increases. The torque, acting to twist blade 20, is equal to the force represented by vector 112, multiplied by the distance between axis 96 and center of mass 97.

The force represented by vector 112 is equal to the centrifugal force acting on mass 64, multiplied by the sine of angle 98, multiplied by the sine of angle 108. The magnitude of vector 112 will, therefore, be a very small portion of force vector 100 and the importance of using blades that are highly flexible in torsion can readily be seen. In general, since the magnitude of vector 112 is proportional to the centrifugal force vector 100, the change in the pitch of the blade 20 will be proportional to the square of the RPM.

The pitch change schedule can be tailored, within certain bounds, by varying the size and location of the weight, the initial blade tip angle 84, and the initial pitch weight angle 92. In addition, the torsional characteristics of the blade 20 can be varied with changes in thickness, tip and hub chord and taper schedule.

Figure 9:
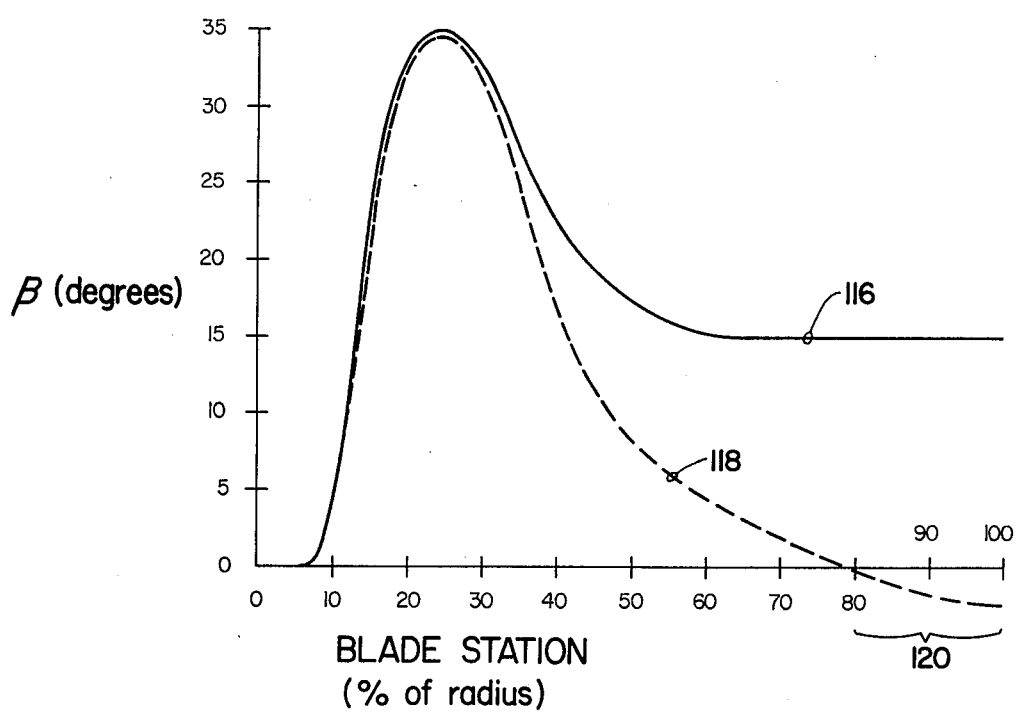
FIG. 9 is a blade pitch schedule illustrating the pitch along the length of the blades, both at rest and at maximum rotational velocity.

A blade twist schedule is shown in FIG. 9. The horizontal axis represents the position on blade 20, and the vertical axis represents the pitch of the blade 20 at its various positions. Line 116 represents the pitch of blade 20 at rest. Line 118 represents the pitch of blade 20 at a high rotational speed. Without such a pitch system, the initial tip angle 84, would have to be fairly small, for example in the neighborhood of 5°, to ensure that the blade would still be at a favorable angle of attack at normal operating speeds. With the pitch system, tip angle 84 can initially be relatively high in the range of approximately 10°–15°, without significant adverse effect to the blades' performance at operating speeds. This has a very advantageous affect upon start-up windspeed for the rotor.

In summary, the variable pitch concept of the turbine blade system 12 may be described as follows. Each blade 20 includes the radially inner fixed end 78 and the radially outer free end 80. The blade 20 is continuously torsionally flexible between the fixed end 78 and the free end 80.

By "torsionally flexible" it is meant that the blade 20 is sufficiently flexible that its pitch may be varied, by use of the out-of-plane weight means 58 to torsionally twist the blade 20 itself, an amount sufficient to significantly effect the aerodynamic characteristics of the blade 20. For example, the pitch may be varied until the blade 20 stalls, thereby causing the turbine blade system 12 to be self-governing.

By "continuously" torsionally flexible it is meant that at any point along the blade 20 between the indicated points, e.g. between inner end 78 and outer end 80, the blade is torsionally flexible.

The out-of-plane weight means 58 is attached to the continuously torsional blade 20 for continuously varying the pitch of the blade 20 as the rotational speed of the turbine blade system 12 is varied. The pitch is continuously varied between a zero pitch variation at fixed end 78 and a maximum pitch variation adjacent out-of-plane weight 58, for a given variation of the rotational speed of the turbine blade system 12.

By "continuously varied" it is meant that the variation in pitch differs along the radial length of blade 20 for a given variation of the rotational speed of the turbine blade system 12. That variation in pitch continuously increases from a zero value at fixed end 78 to a maximum value adjacent out-of-plane weight 58.

In a slightly modified version of the turbine blade system 12, a radially inner portion of blade 20 could be relatively rigid compared to the remainder of the radial length of the blade 20. In such an embodiment the blade 20 would be described as being continuously torsionally flexible between free end 80 and a radially inner point on blade 20, said radially inner point being intermediate of fixed end 78 and free end 80. The weight means 58 would then be a means for continuously varying the pitch of the blade 20 between a maximum variation adjacent weight means 58 and a smaller variation at said radially inner point for a given variation of the rotational speed of turbine blade system 12. With the weight means 58 attached to a radially outer location on blade 20 near the free end 80, the pitch of blade 20 would be continuously varied along substantially the entire radial distance between free end 80 and said radially inner point.

In a preferred embodiment, the blade 20 is a cambered sheet airfoil. A significant characteristic of this type of blade construction is that it does not form a closed section, or torque box. This coupled to the fact that the blade 20 is unrestrained at its radially outward end 80 gives the blade a high degree of torsional flexibility even though it is rigidly attached at its radially inboard end 78. The present invention takes advantage of this characteristic through the addition of the out-of-plane balance weight 58 attached off the leading edge 62 of the blade. The fact that the pitch weight 58 is inclined out of the rotor plane (see FIG. 4) causes it to produce a force or torque, increasing with rotational speed, that tends to rotate the weight back into the plane of the rotor. The combination of the out-of-plane weights 58 and the torsionally flexible blades 20 results in a windmill rotor system which gives changes in blade pitch with changes in rotational speed and, yet, in which all joints are rigid.

In addition to functioning as a blade pitch variation means as just described, the out-of-plane weight assembly 58 solves the problem of torsional flutter in single surface airfoils. Since the elastic axis 96 of the thin sheet airfoils 20 is behind the aerodynamic center of the airfoil, and at or behind the center-of-gravity of the airfoil, there is a tendency for the blades 20 to flutter as the rotational speed increases. Flutter in this case is a self-sustaining torsional vibration of the blades 20 in which the angle of attack varies above and below a nominal value at relatively high frequency, and in such a way as to decrease the aerodynamic performance of the turbine blade system and cause high structural loads. The forward location of the out-of-plane balance weight 64 serves to move the center of gravity well ahead of the elastic center 96 of the blade 20, thereby raising the flutter speed above the operating range of the windmill system.

Thus, the windmill of the present invention is well adapted to obtain the objects and advantages mentioned, as well as those inherent therein. While presently preferred embodiments of the invention have been described for the purpose of this disclosure, numerous changes in the construction and arrangement of parts can be made by those skilled in the art, which changes are emcompassed within the spirit of this invention as defined by the appended claims.

What is claimed is:

1. A variable pitch turbine blade system, comprising:
   a blade, including a radially inner fixed end and a radially outer free end, said blade being continuously torsionally flexible between said free end and a radially inner point on said blade, said radially inner point being intermediate of said fixed end and said free end; and
   an out-of-plane weight means, attached to said blade, for continuously varying a pitch of said blade in response to a variation in rotational speed of said turbine blade system, said pitch being continuously varied between a maximum variation adjacent said weight means and a smaller variation at said radially inner point for a given variation of said rotational speed of said turbine blade system;
   wherein said weight means includes a mass with a center of mass thereof leading an elastic axis of said blade so that said turbine blade system operates free from flutter, and with said center of mass located out of a plane of rotation of said elastic axis of said blade so that a component of a centrifugal force acting on said mass acts to twist said blade about said elastic axis to vary the pitch of said blade.

2. Apparatus of claim 1, wherein said weight means is further characterized as being attached to a radially outer location on said blade and as being a means for continuously varying said pitch of said blade along substantially the entire radial distance between said free end and said radially inner point.

3. Apparatus of claim 2, wherein said center of mass is located forward of said elastic axis, so that said pitch is decreased as the rotational velocity of said turbine blade system is increased.

4. Apparatus of claim 3, wherein said pitch of said blade is oriented at a relatively high positive angle along a radially outer portion of said blade when said turbine blade system is not rotating.

5. Apparatus of claim 4, wherein said blade and said weight means are constructed so that at a predetermined rotational velocity the pitch of the radially outer end of said blade is decreased to a value sufficient to stall the outer end of said blade and cause said turbine blade system to be self-governing at approximately that predetermined rotational velocity.

6. Apparatus of claim 1, 2, 3, 4 or 5, wherein said blade is a cambered sheet blade.

7. A variable pitch turbine blade system, comprising:
   a blade, including a radially inner fixed end and a radially outer free end, said blade being continuously torsionally flexible between said fixed end and said free end; and
   an out-of-plane weight means, attached to said blade, for continuously varying a pitch of said blade in response to a variation in rotational speed of said turbine blade system, said pitch being continuously varied between a zero pitch variation at said fixed end and a maximum pitch variation adjacent said weight means for a given variation of said rotational speed of said turbine blade system;
   wherein said weight means includes a mass with center of mass thereof leading an elastic axis of said blade so that said turbine blade system operates free from flutter, and with said center of mass located out of a plane of rotation of said elastic axis of said blade so that a component of a centrifugal force acting on said mass acts to twist said blade about said elastic axis to vary the pitch of said blade.

8. Apparatus of claim 7, wherein said weight means is further characterized as being attached to a radially outer location on said blade and as being a means for continuously varying said pitch of said blade along substantially its entire radial length.

9. Apparatus of claim 8, wherein said center of mass is located forward of said elastic axis, so that said pitch is decreased as the rotational velocity of said turbine blade system is increased.

10. Apparatus of claim 9, wherein said pitch of said blade is oriented at a relatively high positive angle along a radially outer portion of said blade when said turbine blade system is not rotating.

11. Apparatus of claim 10, wherein said blade and said weight means are constructed so that at a predetermined rotational velocity the pitch of the radially outer end of said blade is decreased to a value sufficient to stall the outer end of said blade and cause said turbine blade system to be self-governing at approximately that predetermined rotational velocity.

12. Apparatus of claim 7, 8, 9, 10, or 11, wherein said blade is a cambered sheet blade.

13. A windmill, comprising:
   a shaft;
   a turbine blade system;
   first and second permanent magnet alternators, each of said alternators including a multiple pole stator fixedly mounted on said shaft and a multiple magnet permanent magnet structure rotatably mounted coaxial with said stator, said turbine blade system being connected to said magnet structures to rotate therewith, the poles of said stator of said second alternator being angularly offset from the poles of said first alternator and wherein the magnets of said magnet structures of said first and second alternators are aligned in axial rows so that only one of said first and second alternators can have the poles of its stator radially aligned with the magnets of its magnet structure at any given time.

14. Apparatus of claim 13, wherein the magnets of each of said axial rows are further characterized as being oriented so that magnet ends facing the stators all have the same magnetic sign.

15. Apparatus of claim 13, further comprising a third alternator, the poles of said third alternator being angularly offset from the poles of said second alternator so that only one of said first, second and third alternators can have the poles of its stator radially aligned with the magnets of its magnet structure at any given time.

16. Apparatus of claim 15, wherein the magnets of said magnet structures of said first, second and third alternators are aligned in axial rows.

17. Apparatus of claim 16, wherein the magnets of each of said axial rows are further characterized as being oriented so that magnet ends facing the stators all have the same magnetic sign.

18. Apparatus of claim 15, further comprising first, second and third stator spacers, slidingly received on said shaft and fixed thereto, said first, second and third stators being attached to said first, second and third stator spacers, respectively.

19. Apparatus of claim 13, wherein said turbine blade system comprises:
a central hub, attached to said magnet structures;
a blade having a radially inner end, fixedly attached to said hub, and a radially outer free end.

20. Apparatus of claim 19, wherein said blade is torsionally flexible.

21. Apparatus of claim 20, wherein said turbine system blade system further comprises an out-of-plane weight attached to a radially outer location on said blade, so that the pitch of said blade is continuously decreased, with increasing rotational velocity of said turbine blade system, until a portion of said blade is stalled causing the turbine blade system to be self-governing at approximately the rotational velocity at which said stall occurs.

22. Apparatus of claim 21, wherein a center of mass of said weight leads an elastic axis of said blade, and is located forward of said elastic axis.

23. Apparatus of claim 13, 14, 15, 16, 17, 18, 19, 20, 21 or 22, wherein:
said first permanent magnet alternator includes an equal number of poles and magnets; and
said second permanent magnet alternator includes an equal number of poles and magnets.

24. A windwill, comprising:
a turbine blade system;
first and second electrical generating means, each of said generating means including a fixedly mounted multiple pole stator and including a multiple pole rotor rotatably mounted coaxial with said stator, said turbine blade system being connected to said rotors to rotate therewith, said first and second electrical generating means being arranged so that at any given time only one of said first and second electrical generating means can have its stator poles and its rotor poles so relatively positioned as to present a maximum cogging force for said one generating means, so that at any given time a total cogging force presented by said first and second electrical generating means is less than a total of a maximum cogging force of said first generating means plus a maximum cogging force of said second generating means.

25. The windmill of claim 24, wherein:
the poles of said stator of said second generating means are angularly offset from the poles of said stator of said first generating means.

26. The windmill of claim 25, wherein:
the poles of said rotors of said first and second generating means are aligned in axial rows.

27. The windmill of claim 26, wherein:
the rotor poles of each of said axial rows all have the same magnetic sign.

28. The windmill of claim 24, wherein:
said first generating means includes an equal number of stator poles and rotor poles; and
said second generating means includes an equal number of stator poles and rotor poles.

29. A windmill, comprising:
a shaft;
a turbine blade system;
first and second permanent magnet alternators, each of said alternators including a multiple pole stator fixedly mounted on said shaft and a multiple magnet permanent magnet structure rotatably mounted coaxial with said stator, said turbine blade system being connected to said magnet structures to rotate therewith, the poles of said stator of said second alternator being angularly offset from the poles of said first alternator;
wherein said turbine blade system includes:
a central hub, attached to said magnet structures;
a torsionally flexible blade having a radially inner end, fixedly attached to said hub, and a radially outer free end; and
an out-of-plane weight attached to a radially outer location on said blade, so that the pitch of said blade is continuously decreased, with increasing rotational velocity of said turbine blade system, until a portion of said blade is stalled causing the turbine blade system to be self-governing at approximately the rotational velocity at which said stall occurs.

30. Apparatus of claim 29, wherein a center of mass of said weight leads an elastic axis of said blade, and is located forward of said elastic axis.

31. Apparatus of claim 29 or 30, wherein:
said first permanent magnet alternator includes an equal number of poles and magnets; and
said second permanent magnet alternator includes an equal number of poles and magnets.

* * * * *